United States Patent
Kim et al.

(10) Patent No.: US 8,068,353 B2
(45) Date of Patent: Nov. 29, 2011

(54) SWITCHING MODE POWER SUPPLY CIRCUIT

(75) Inventors: Sung Ho Kim, Hwaseong-si (KR); Kwang Seung Cho, Suwon-si (KR); Heung Gyoon Choi, Suwon-si (KR)

(73) Assignee: Samsung Electro-Mechanics Co., Ltd., Suwon-si, Gyunggi-do (KR)

( * ) Notice: Subject to any disclaimer, the term of this patent is extended or adjusted under 35 U.S.C. 154(b) by 481 days.

(21) Appl. No.: 12/246,907

(22) Filed: Oct. 7, 2008

(65) Prior Publication Data
US 2009/0316455 A1 Dec. 24, 2009

(30) Foreign Application Priority Data
Jun. 20, 2008 (KR) .................. 10-2008-0058316

(51) Int. Cl.
*H02M 3/335* (2006.01)

(52) U.S. Cl. .................. 363/21.07; 363/21.12

(58) Field of Classification Search .............. 363/16–20, 363/21.02, 21.12, 21.13, 65, 84, 74, 97–98; 323/222, 282–290, 207, 219; 307/65, 104
See application file for complete search history.

(56) References Cited

U.S. PATENT DOCUMENTS
6,362,980 B1 * 3/2002 Ohashi et al. .............. 363/21.01

FOREIGN PATENT DOCUMENTS
JP 2003-158693 A 5/2003
KR 1020080010582 A 1/2008
* cited by examiner

*Primary Examiner* — Rajnikant Patel
(74) *Attorney, Agent, or Firm* — Lowe Hauptman Ham & Berner LLP

(57) ABSTRACT

A switching mode power supply (SMPS) circuit includes: a rectifying unit that rectifies an AC voltage applied from an AC input terminal; a power factor correction (PFC) and standby voltage output unit that is connected to the rectifying unit and has a PFC part and a standby voltage output part integrated therein; a PFC and standby voltage control unit that is connected to the PFC and standby voltage output unit and controlling the PFC and standby voltage output unit; and a DC/DC conversion unit that is connected to the PFC and standby voltage output unit and outputting a main voltage.

4 Claims, 3 Drawing Sheets

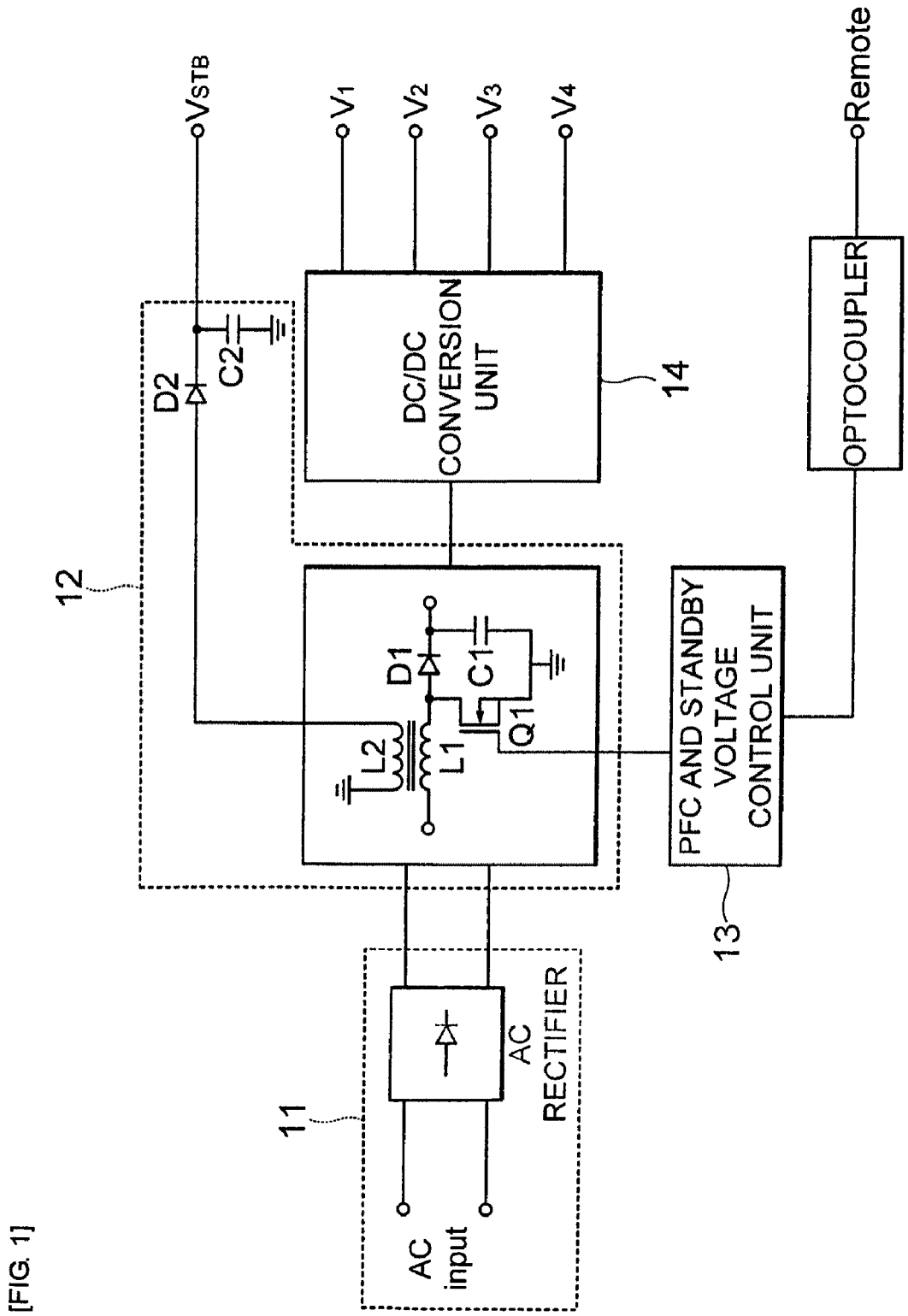
[FIG. 1]

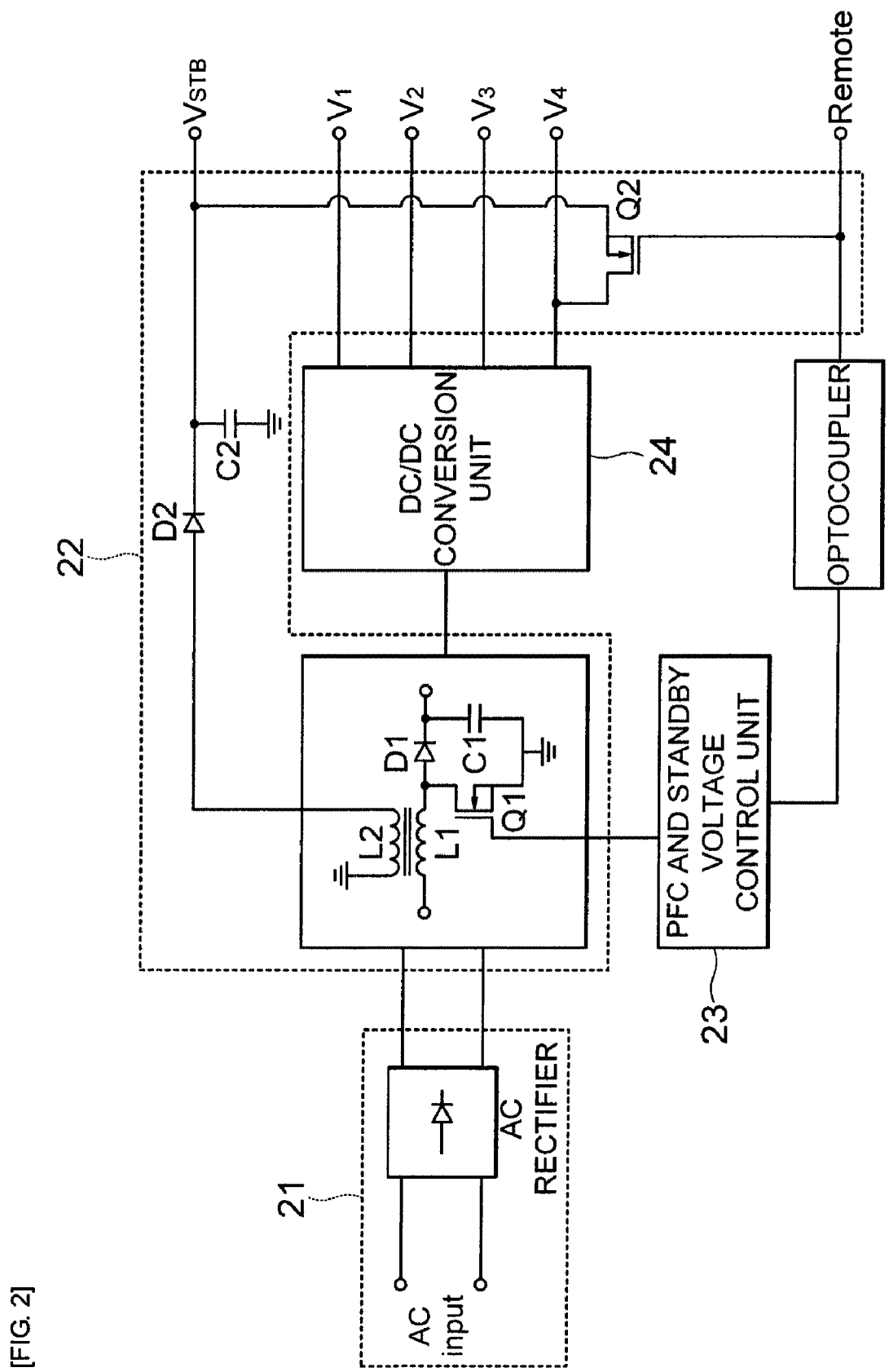
[FIG. 2]

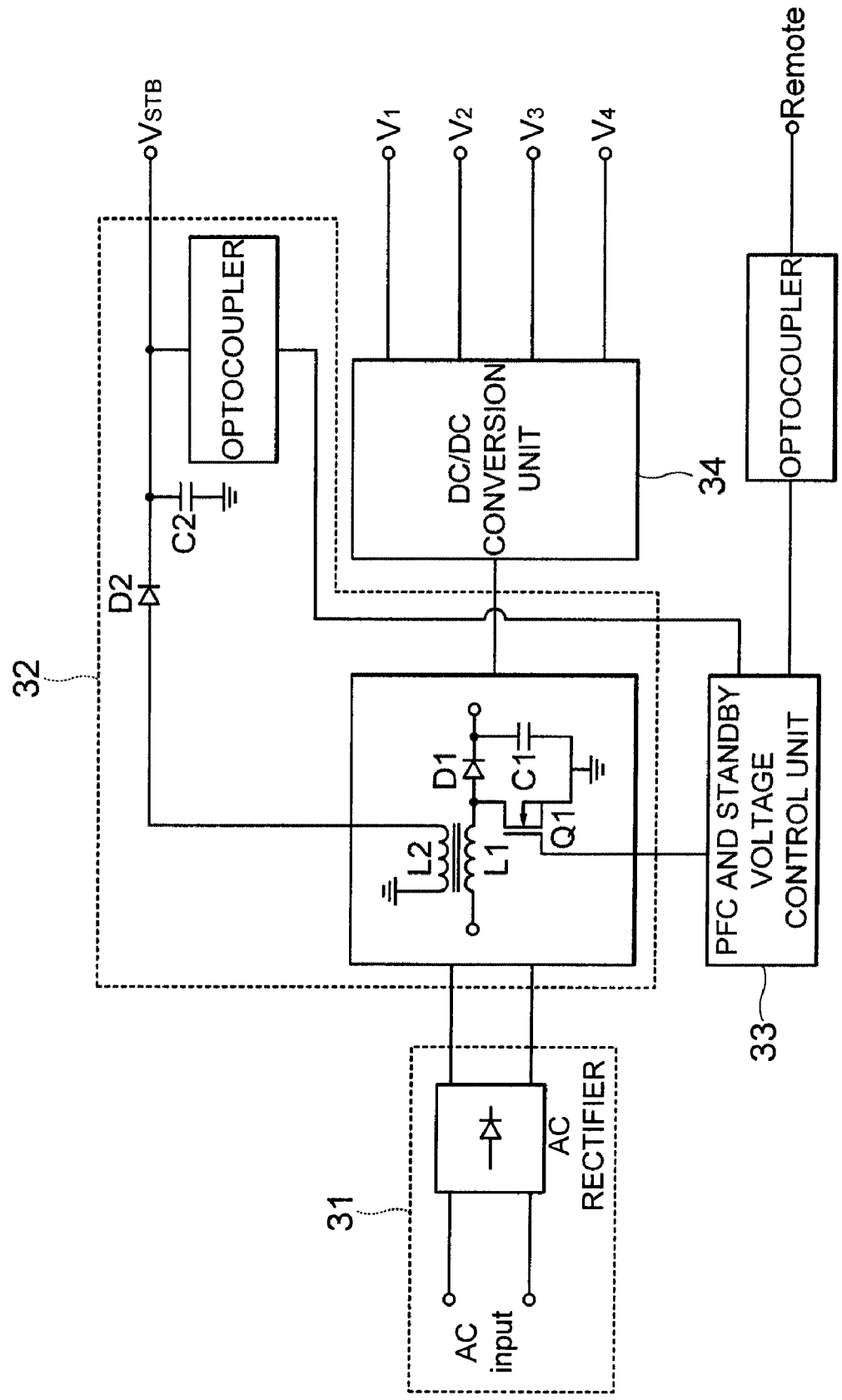
[FIG. 3]

SWITCHING MODE POWER SUPPLY CIRCUIT

CROSS-REFERENCE TO RELATED APPLICATIONS

This application claims the benefit of Korean Patent Application No. 10-2008-0058316 filed with the Korean Industrial Property Office on Jun. 20, 2008, the disclosure of which is incorporated herein by reference.

BACKGROUND OF THE INVENTION

1. Field of the Invention

The present invention relates to a switching mode power supply (SMPS) circuit, and more particularly, to an SMPS circuit in which a power factor correction (PFC) part and a standby voltage output part are integrated.

2. Description of the Related Art

A display is a medium that provides information by visually displaying various data on a screen. Due to the advance of digitalization and information, various kinds of displays are introduced and used in various fields. In the past several ten years, Cathode Ray Tube (CRT) has been a main stream of a display market. However, with the development of data communication and Internet, a customer's demand for displays having high performance and high picture quality is increasing and hence the CRT is rapidly replaced with a Flat Panel Display (FPD). A Liquid Crystal Display (LCD) or Plasma Display Panel (PDP), which is under rapid technical development, quickly replaces monitors and TVs, which have been dominated by the CRT. At the same time, the LCD or PDP exploits new application fields, such as notebook computers, mobile phones and vehicle parts, and is used in most applications ranging from small-size products to large-sized products.

Such an LCD or PDP uses an SMPS circuit, as its power supply circuit, which generates various voltages in order to supply a plurality of low voltages.

In a conventional SMPS circuit, a standby voltage output unit is separately provided in order to reduce power consumption in a standby mode. Only the standby voltage output unit is operated, while a Power Factor Correction (PFC) unit and the other output units of a system are not operated.

SUMMARY OF THE INVENTION

An advantage of the present invention is that it provides an SMPS circuit, in which a PFC part and a standby voltage output part are integrated, thereby omitting the standby voltage output part, which has been separately provided, and achieving a cost reduction by the simplification of parts.

Additional aspects and advantages of the present general inventive concept will be set forth in part in the description which follows and, in part, will be obvious from the description, or may be learned by practice of the general inventive concept.

According to an aspect of the invention, an SMPS circuit includes: a rectifying unit that rectifies an AC voltage applied from an AC input terminal; a power factor correction (PFC) and standby voltage output unit that is connected to the rectifying unit and has a PFC part and a standby voltage output part integrated therein; a PFC and standby voltage control unit that is connected to the PFC and standby voltage output unit and controlling the PFC and standby voltage output unit; and a DC/DC conversion unit that is connected to the PFC and standby voltage output unit and outputting a main voltage.

The PFC part of the PFC and standby voltage output unit may include a first inductor, a first diode, a first capacitor, and a first switching element in order to correct a power factor of a voltage that passes through the rectifying unit.

The first inductor and the first capacitor may be connected to both terminals of the first diode, and the first switching element may be connected to a contact point between the first inductor and the first diode.

The standby voltage output part of the PFC and standby voltage output unit may include: a second inductor coupled to the first inductor of the PFC part to receive a voltage induced in the first inductor; a second diode connected to the second inductor; and a second capacitor having one terminal connected to the second diode and the other terminal grounded.

The SMPS circuit may further include a second switching element connected between one terminal of the second capacitor, which is connected to the second diode, and any one of main voltage terminals.

One terminal of the second capacitor, which is connected to the second diode, and the PFC and standby voltage control unit may be connected through an optocoupler, so that the standby voltage is fed back to the PFC and standby voltage control unit.

The first and second switching elements may be transistors.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a circuit diagram of an SMPS circuit according to a first embodiment of the present invention;

FIG. 2 is a circuit diagram of an SMPS circuit according to a second embodiment of the present invention; and FIG. 3 is a circuit diagram of an SMPS circuit according to a third embodiment of the present invention.

DETAILED DESCRIPTION OF THE PREFERRED EMBODIMENTS

Reference will now be made in detail to the embodiments of the present general concept, examples of which are illustrated in the accompanying drawings, wherein like reference numerals refer to like elements throughout. The embodiments are described below in order to explain the present general inventive concept by referring to the figures. In the drawings, the thicknesses of layers and regions are exaggerated for clarity.

Hereinafter, SMPS circuits according to embodiments of the present invention will be described in detail with reference to the accompanying drawings.

First Embodiment

FIG. 1 is a circuit diagram of an SMPS circuit according to a first embodiment of the present invention. Referring to FIG. 1, the SMPS circuit includes a rectifying unit 11, a PFC and standby voltage output unit 12, a PFC and standby voltage control unit 13, and a DC/DC conversion unit 14.

More specifically, the rectifying unit 11 includes an AC input terminal and an AC rectifier. If an AC voltage is input through the AC input terminal, the AC rectifier rectifies the AC voltage. In this case, the AC rectifier may rectify the AC voltage through a rectifying circuit including diodes.

The PFC and standby voltage output unit 12 is disposed at the next stage of the rectifying unit 11 and may include a PFC part for compensating a power factor, and a standby voltage output part for outputting a standby voltage.

First, the PFC part may include a first inductor L1, a first diode D1, a first capacitor C1, and a first switching element Q1 in order to correct the power factor of the voltage that has passed through the rectifying unit 11. The first inductor L1 and the first capacitor C1 may be respectively connected to both terminals of the first diode D1, and the first switching element Q1 may be connected to a contact point between the first inductor L1 and the first diode D1. In addition, the first switching element Q1 may be implemented with a transistor.

Next, the standby voltage output part may include a second inductor L2, a second diode D2, and a second capacitor C2. The second inductor L2 is coupled to the first inductor L1 to receive a voltage induced in the first inductor L1, and the second diode D2 is connected to the second inductor L2. One terminal of the second capacitor C2 may be connected to the second diode D2, and the other terminal of the second capacitor C2 may be grounded.

The PFC and standby voltage control unit 13 is connected to the PFC and standby voltage output unit 12, and functions to control the PFC and standby voltage output unit 12 according to the input voltage and the standby voltage.

Furthermore, the PFC and standby voltage control unit 13 is connected to a remote terminal through an optocoupler. In a standby mode, if a signal is output from the remote terminal, the signal is applied to the PFC and standby voltage control unit 13 through the optocoupler to operate the PFC and standby voltage output unit 12 and output the standby voltage.

The DC/DC conversion unit 14 is connected to the PFC and standby voltage output unit 12 and can output main voltages V1 to V4.

Upon the operation of the SMPS circuit according to the present invention, the signal applied from the remote terminal is applied to the PFC and standby voltage control unit 13 through the optocoupler. If the signal is applied, the PFC and standby voltage control unit 13 determines a current mode as the standby mode and operates the PFC and standby voltage output unit 12.

In this case, the second inductor L2 of the standby voltage output part in the PFC and standby voltage output unit 12 receives the voltage induced in the first inductor L1 of the PFC part, and the second diode D2 and the second capacitor C2 rectify the induced voltage and output the standby voltage.

The SMPS circuit according to the present invention constitutes the PFC and standby voltage output unit 12 by integrating the PFC part and the standby voltage output part. Therefore, the standby voltage output part of the conventional SMPS circuit is removed to achieve the cost reduction.

Second Embodiment

FIG. 2 is a circuit diagram of an SMPS circuit according to a second embodiment of the present invention.

The SMPS circuit according to the second embodiment of the present invention has almost the same structure as the SMPS circuit according to the first embodiment of the present invention, except that it further includes a second switching element Q2 connected between one terminal of the second capacitor, which is connected to the second diode of the standby voltage output part of the PFC and standby voltage output unit 22, and any one of the main voltage (V1-V4) output terminals. Furthermore, the second switching element Q2 may be implemented with a transistor.

Specifically, the SMPS circuit according to the second embodiment of the present invention uses a transistor as the second switching element Q2. The transistor has a source connected to one terminal of the second capacitor C2 connected to the second diode D2, a drain connected to the fourth voltage (V4) output terminal, which is one of the main voltage (V1-V4) output terminals, and a gate connected to a remote terminal.

Upon operation of the SMPS circuit according to the second embodiment of the present invention, if there is a problem in outputting the standby voltage at the first inductor L1 of the PFC part of the PFC and standby voltage output unit 22, the transistor is turned on when a signal recognized as a standby mode is applied from the remote terminal connected to the gate of the transistor, so that the voltage of the fourth voltage (V4) output terminal is supplied to the standby voltage output terminal.

Therefore, the SMPS circuit according to the second embodiment of the present invention has the advantages of the first embodiment of the present invention, and also has an advantage that stably outputs the standby voltage using the main voltages V1 to V4 even when there is a problem in outputting the standby voltage at the first inductor L1.

Third Embodiment

FIG. 3 is a circuit diagram of an SMPS circuit according to a third embodiment of the present invention.

The SMPS circuit according to the third embodiment of the present invention has almost the same structure as the SMPS circuit according to the first embodiment of the present invention, except that one terminal of the second capacitor, which is connected to the second diode of the standby voltage output part of the PFC and standby voltage output unit 32, and the PFC and standby voltage control unit 33 are connected through the optocoupler, so that the standby voltage is fed back to the PFC and standby voltage control unit 33.

Referring to FIG. 3, by feeding back the standby voltage, which is output through the optocoupler, to the PFC and standby voltage control unit 33, the PFC and standby voltage control unit 33 can supply the stable standby voltage by properly controlling the unstably supplied standby voltage.

Therefore, the SMPS circuit according to the third embodiment of the present invention has the advantages of the first embodiment of the present invention, and also an advantage that can supply the stable standby voltage by feeding back the standby voltage to the standby voltage control unit 33.

In the SMPS circuit according to the present invention, the PFC unit and the standby voltage output unit are integrated, thereby omitting the standby voltage output unit, which has been separately provided, and achieving the cost reduction by the simplification of parts.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A switching mode power supply (SMPS) circuit, comprising:
   a rectifying unit that rectifies an AC voltage applied on an AC input terminal;
   a power factor correction (PFC) and standby voltage output unit that is connected to the rectifying unit and has a PFC part and a standby voltage output part integrated therein, wherein the PFC part comprises a first inductor, a first diode, a first capacitor, and a first switching element in order to correct a power factor of a voltage that passes through the rectifying unit, and wherein the first inductor and the first capacitor are connected to respective terminals of the first diode, and the first switching element is connected to a contact point between the first inductor and the first diode, and wherein the standby voltage output part comprises a second inductor coupled to the first inductor to receive a voltage induced in the first inductor, a second diode connected to the second inductor, and a second capacitor having one terminal connected to the second diode and the other terminal grounded;

a PFC and standby voltage control unit that is connected to the PFC and standby voltage output unit and controlling the PFC and standby voltage output unit; and a DC/DC conversion unit that is connected to the PFC and standby voltage output unit and outputting a main voltage.

2. The SMPS circuit according to claim 1, further comprising a second switching element connected between one terminal of the second capacitor connected to the second diode and any one of main voltage terminals.

3. The SMPS circuit according to claim 1, wherein one terminal of the second capacitor, which is connected to the second diode, and the PFC and standby voltage control unit are connected through an optocoupler, so that the standby voltage is fed back to the PFC and standby voltage control unit.

4. The SMPS circuit according to claim 1, wherein the first and second switching elements are transistors.

* * * * *